Figure 1:
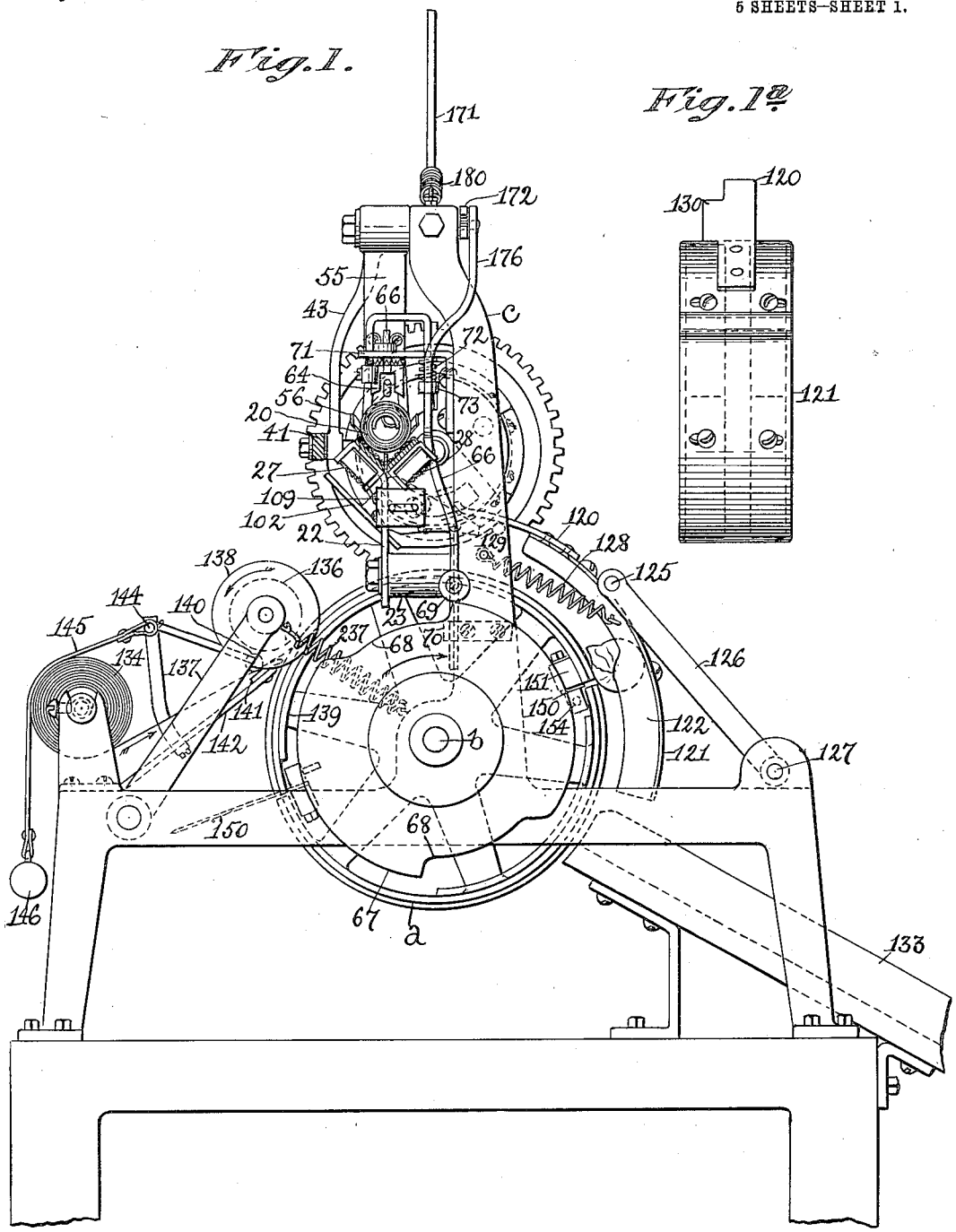

C. J. LANDIN.
MACHINE FOR COVERING CIRCULAR OBJECTS.
APPLICATION FILED DEC. 23, 1912.

1,134,208.

Patented Apr. 6, 1915.
5 SHEETS—SHEET 3.

Witnesses,
M. G. Crozier
J. Murphy

Inventor,
Carl John Landin
by Jas. H. Churchill
Atty.

C. J. LANDIN.
MACHINE FOR COVERING CIRCULAR OBJECTS.
APPLICATION FILED DEC. 23, 1912.
1,134,208.
Patented Apr. 6, 1915.
5 SHEETS—SHEET 4.
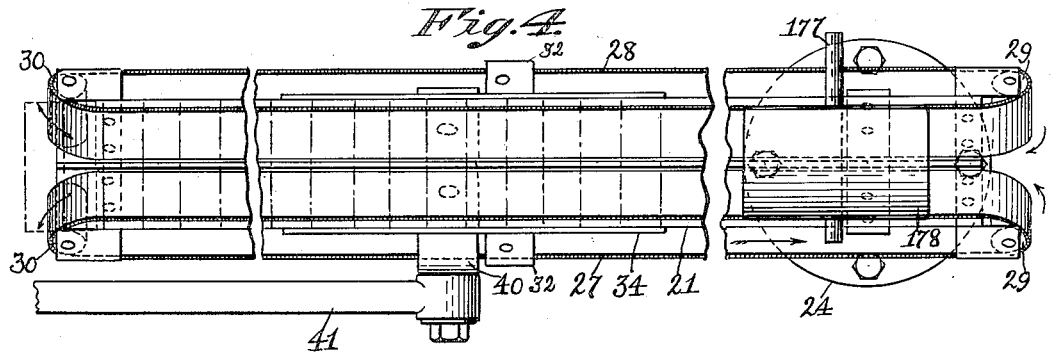
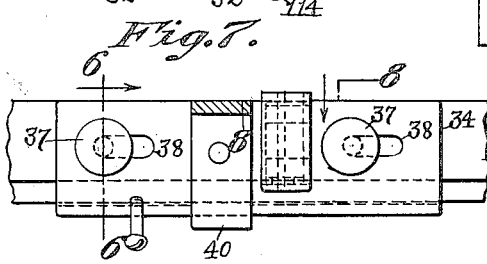
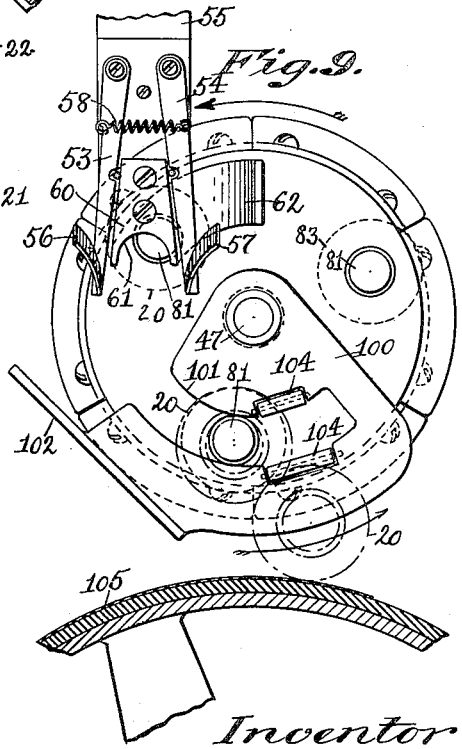
Witnesses:
Inventor
Carl John Landin
by Jas. H. Churchill
Atty.

C. J. LANDIN.
MACHINE FOR COVERING CIRCULAR OBJECTS.
APPLICATION FILED DEC. 23, 1912.

1,134,208.

Patented Apr. 6, 1915.
5 SHEETS—SHEET 5.

Witnesses:
M. G. Crozier
J. Murphy

Inventor;
Carl John Landin
by Jas. H. Churchill
Atty.

UNITED STATES PATENT OFFICE.

CARL JOHN LANDIN, OF BOSTON, MASSACHUSETTS, ASSIGNOR TO BOSTON WOVEN HOSE AND RUBBER COMPANY, OF CAMBRIDGE, MASSACHUSETTS, A CORPORATION OF MASSACHUSETTS.

MACHINE FOR COVERING CIRCULAR OBJECTS.

1,134,208.

Specification of Letters Patent. Patented Apr. 6, 1915.

Application filed December 23, 1912. Serial No. 738,157.

*To all whom it may concern:*

Be it known that I, CARL JOHN LANDIN, a citizen of the United States, residing in Boston, county of Suffolk, and State of Massachusetts, have invented an Improvement in Machines for Covering Circular Objects, of which the following description, in connection with the accompanying drawings, is a specification, like letters on the drawings representing like parts.

This invention relates to a machine for covering circular objects with flexible material, and is especially applicable for covering rolls of rubber tape with tin foil or like material.

The invention has for its object to provide a machine which is particularly well adapted for covering a large number of substantially small rolls of tape in a minimum time.

To this end, the machine is provided with a rotatable bed roll upon which is fed the covering material for the rolls, which will be hereinafter referred to as tin foil, and with which coöperates a support for a plurality of uncovered rolls, and a feed mechanism for feeding the uncovered rolls on said support toward the plane of rotation of the bed roll, and into position to be engaged by a rotatable transfer device, which carries the uncovered roll down toward the bed roll and into position to contact with the tin foil thereon, which is wound upon the uncovered roll, as will be described.

The machine is provided with a knife to cut a length of tin foil from a continuous strip of tin foil, and with mechanism to operate said knife in a novel manner, as will be described.

The machine may and preferably will be provided with a novel chute for guiding the uncovered roll during its transfer from its support to the bed roll, as will be described. Provision is also made for pressing the uncovered roll down on the cut portion of the tin foil on the bed roll, to cause the uncovered roll to be revolved by the bed roll to wind the tin foil on its circumference.

These and other features of this invention will be pointed out in the claims at the end of this specification.

Figure 2:
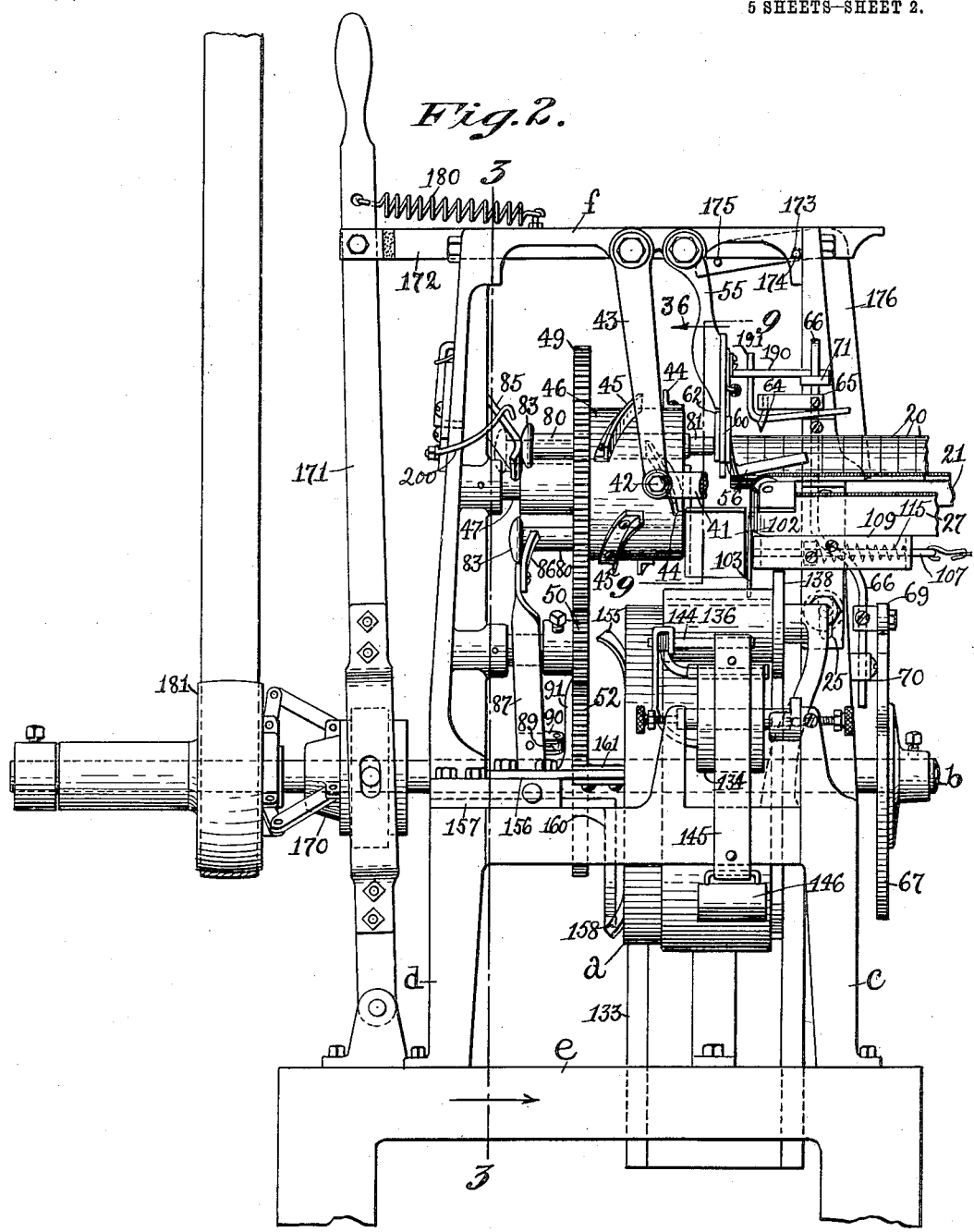
Figures 3, 3A, 3B:
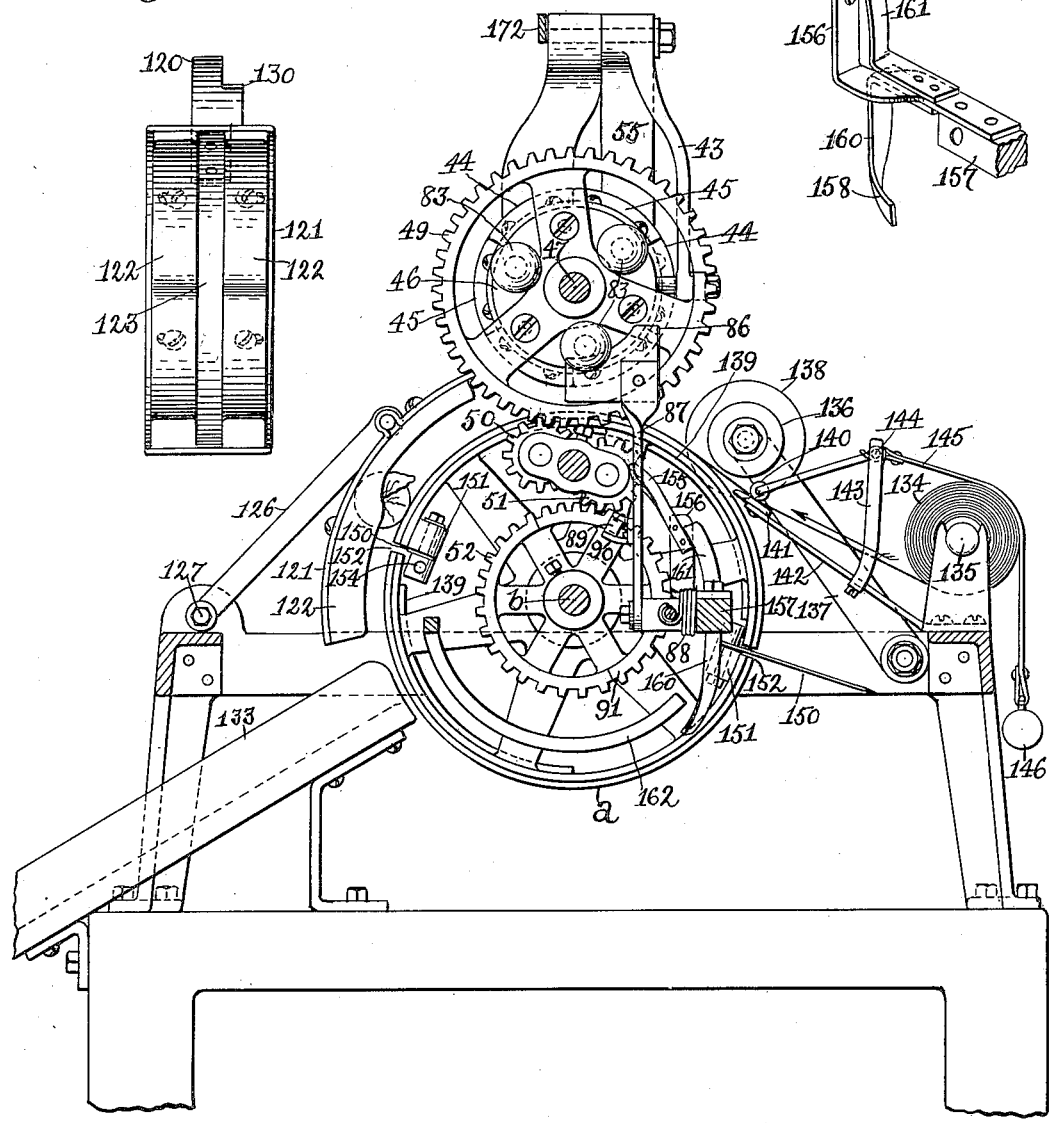
Figure 11:
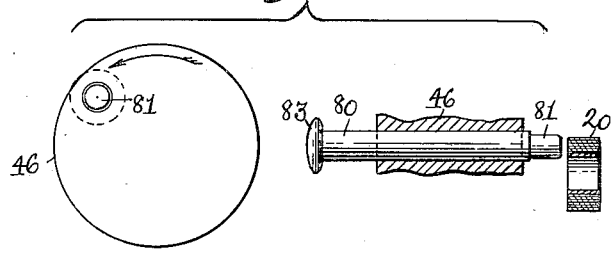
Figure 12:
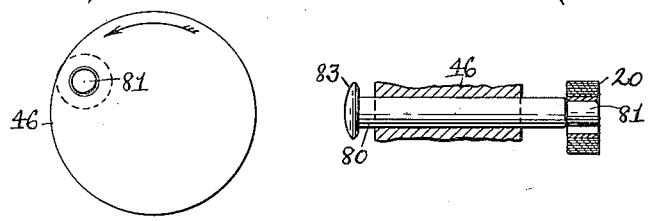
Figure 13:
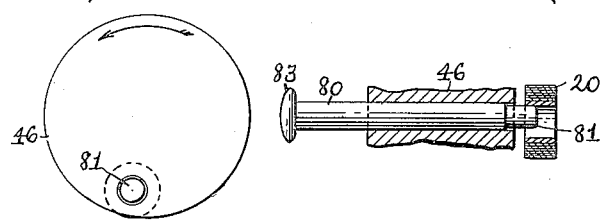
Figure 14:
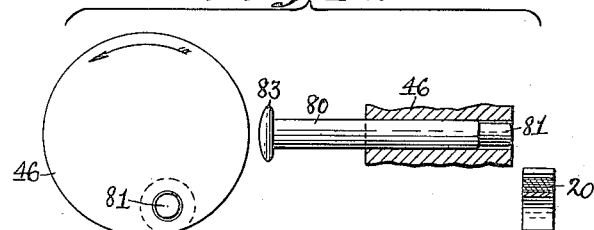
Figure 15:
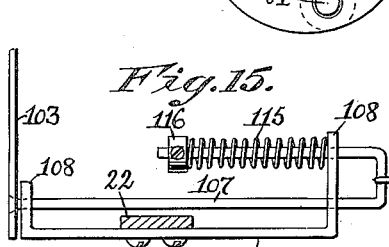
Figure 16:
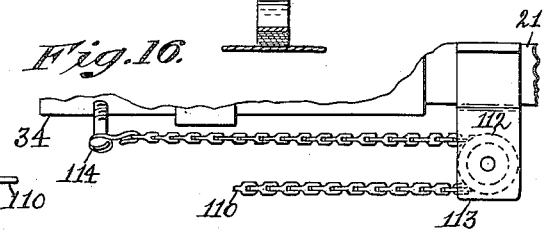

Figure 1 is a side elevation and section of a machine embodying this invention. Fig. 1ª, a detail of the presser and folder to be referred to. Fig. 2, a front elevation of the machine shown in Fig. 1 looking toward the right. Fig. 3, a section on the line 3—3, Fig. 2, looking toward the right. Fig. 3ª, an underside view of the presser and folder shown in Fig. 1ª. Fig. 3ᵇ, a detail of the knife operating cams to be referred to. Fig. 4, a plan view of the support and feed mechanism for the uncovered rolls. Fig. 5, an end elevation of the support shown in Fig. 4. Fig. 6, a section of the support and feed mechanism, taken on the line 6—6, Fig. 7. Fig. 7, a detail in side elevation of the support and feed mechanism. Fig. 8, a detail in section on the line 8—8, Fig. 7, of the feed mechanism for the uncovered rolls. Fig. 9, a detail on an enlarged scale with a portion of the bed roll shown in section, which is taken on the line 9—9, Fig. 2. Fig. 10, a detail of the bed roll and the knife for cutting the tin foil. Figs. 11 to 14, diagrammatic views to illustrate the operation of the transfer mechanism. Fig. 15, a detail in plan showing the movable side of the chute, and Fig. 16, a detail to be read in connection with Fig. 15.

Referring to the drawings, $a$ represents a bed roll, which is shown as a wheel or drum fast on a rotatable shaft $b$, journaled in the side uprights $c$, $d$, erected upon a base frame $e$, said uprights being connected at their upper end by a cross or tie bar $f$.

The bed roll $a$ has coöperating with it a support or holder for a plurality of uncovered rolls 20, such as rolls of rubber tape and which will be hereinafter referred to as the tape rolls. The support or holder, in the present instance, comprises a V-shaped trough or frame 21, which extends laterally from the side upright $c$ and is fastened to the latter at one end by a depending bracket or arm 22, see Fig. 1, which is secured to a stud 23 on said upright, and at its opposite or outer end, the said holder is secured to a post, not shown, but which is provided with a base plate 24, see Fig. 4, secured to the floor or other support. The bracket 22 is provided with a slot 25 to permit vertical adjustment of the discharge end of the holder.

The holder or support has coöperating with it, two endless bands 27, 28, preferably of canvas or like material, which are passed about rollers 29, 30, suitably journaled at the opposite ends of the V-shaped holder 21. The endless bands 27, 28, form part of the feed mechanism for the tape rolls, and constitute a movable carrier for the tape rolls 20 which rest directly upon them, so that when the said bands are moved toward the bed roll *a*, the tape rolls are advanced or fed toward the bed roll.

The endless carriers 27, 28 are moved intermittently by mechanism, as will now be described. The lower half or lap of each endless carrier has coöperating with it a feed pawl or dog 31, see Fig. 8, which is pivoted in a yoke or frame 32, secured as by rivets 33 to a V-shaped bar 34, which is secured to the underside of the V-shaped holder 21 to slide thereon. Each feed pawl 31 is provided with teeth at its lower end to engage the endless carrier and force it against the bottom of the yoke 32, when the pawl and its supporting yoke are moved in one direction, indicated by the arrow 36 in Fig. 8, and to release said carrier when the pawl and its yoke are moved in the opposite direction. The V-shaped bar 34 is secured in sliding engagement with the sides of the holder 21, as shown by rivets 37 having their shanks extended through suitable slots 38, see Fig. 7, which are extended in the direction of the length of the slide bar 34, and which permit the pawl carrying bar 34 to be moved on the holder 21.

The feed pawls 31 are preferably pressed into engagement with the endless carriers by springs 39, see Fig. 8. The sliding bar 34 has fastened to it a V-shaped bracket 40, see Figs. 4 to 7, to which is pivotally connected one end of a link 41, which has its opposite end pivotally mounted on a stud 42, carried by the lower end of a lever 43, see Fig. 2, which is pivoted at its upper end to the cross bar *f* of the framework. The lever 43 is oscillated, as will be described, and when moved in one direction indicated by the arrow 36, Fig. 2, the pawl carrying bar 34 is moved in the same direction, and the feed pawls bite into the canvas bands 27, 28 and carry the bands with them a distance substantially equal to the width of one of the tape rolls 20, and when the said lever is moved in the opposite direction, the bar 34 is moved backward, and in this movement of the said bar, the feed pawls slip over the canvas bands, which latter remain stationary.

The lever 43 is oscillated by means of cams herein shown as curved pieces 44, 45 secured to the periphery of a drum or hub 46, loose on a shaft 47, supported by the upright side *d*. In the present instance the drum 46 is provided with three sets or pairs of cams, each set comprising two cams 44, 45, which are arranged to oppose each other and so as to act on the lever 43 in succession. The cam 45 of each set acts on the lever 43 to move the feed pawls 31 backward, to enable them to get a new grip on the endless bands, and the other cam 44 acts on the lever 43 to move the feed pawls forward, to move the endless bands forward toward the plane of rotation of the bed roll. In the present instance the feed mechanism is operated to move the endless bands forward three times for each revolution of the cam drum, which latter is provided with a gear 49, connected by intermediate gears 50, 51, see Fig. 3, with a gear 52 fast on the shaft *b* of the bed roll *a*.

The endless bands 27, 28 have coöperating with them, means for supporting the endmost tape roll, after it has passed off of the endless bands, said means being herein shown as two levers 53, 54, see Figs. 2 and 9, which are pivoted at their upper ends to a rocker arm 55, pivoted to the cross bar *f*. The levers 53, 54 are provided with arms 56, 57, which are inclined or curved to form gripping arms for the endmost tape roll; said arms being held in engagement with the endmost tape roll by a spring 58 connecting the levers 53, 54, see Fig. 9.

The rocker arm 55 has attached to its lower end a plate or bar 60 provided in its under surface with a substantially semicircular recess 61, see Fig. 9, and against which the endmost tape roll is pressed by the tape rolls on the endless bands 27, 28. The plate 60 is provided with a lateral arm or extension 62, see Fig. 9, for a purpose as will be described.

Provision is made for holding the next to the endmost roll firmly on the V-shaped holder 21, while the endmost roll is being transferred to the bed roll. To this end there is located above the endless bands substantially in the plane of the rollers 30, a presser or holding device, herein shown as a slotted arm 64, see Figs. 1 and 2, which is preferably beveled at its lower end to sink into the tape roll next to the endmost roll. The slotted arm 64 is fastened to a horizontal arm 65, secured to a vertically movable rod 66, see Fig. 2, which is raised by a cam disk 67 fast on the bed roll shaft *b*, said disk having two diametrically opposite depressions 68 in its periphery, which form cams and coöperate with a roller 69 carried by the rod 66 near its lower end. The rod 66 is guided at its lower end by a lug 70 on the upright side *c* of the framework, and at its upper end by a bracket 71 attached to said upright side. The vertical rod 66 is raised by the cam disk 67 and is lowered by a spring 72, encircling the rod between the under-side of the bracket 71 and a collar 73 fast on said rod, which latter is bent at its free end and is extended down through the bracket 71, see Fig. 1.

The presser 64 is forced by the spring 72 down into engagement with the next to the endmost tape roll, when a cam 68 engages the roller 69, and said tape roll is held from being carried with the endmost roll toward the plane of the bed roll, thereby overcoming liability of the next to the endmost roll being displaced on the holder by the removal of the endmost tape roll.

The endmost tape roll between the spring arms 56, 57, is engaged by a spindle or rod 80, which is carried by the cam drum 46 and extends through a hole therethrough, said spindle being provided at one end with a reduced portion 81 of substantially the diameter of the center bore or hole 82 in the tape roll, and having at its opposite end a head 83, which is engaged by suitable devices, as will be described, for sliding the spindle back and forth in the cam drum.

In the present instance, the machine is provided with three spindles 80, but as they all operate in the same manner, a detailed description of the operation of one will suffice to enable this part of the invention to be understood. It will be understood, that the spindle 80 has two distinct movements, that is, it is moved in a circular path by the rotation of the cam drum 46 and is moved in a straight path transversely with relation to its rotary path. These movements may be designated the rotary and the reciprocating movements respectively for sake of clearness.

During the rotary movement, the spindle is brought into line with the axial center of the tape rolls 20 on the endless bands, and when thus positioned, the spindle is moved longitudinally in one direction to cause its reduced end portion 81 to enter the bore 82 of the endmost tape roll, and then the spindle is moved back and at the same time is moved downwardly in its circular path, and carries the endmost tape roll down from between the yielding arms 56, 57 and toward the bed roll. The spindle 80 is moved forward to enter the uncovered rolls, by a cam which is herein shown as a spring actuated bar or arm 85, pivoted at one end to the upright side *d* of the framework, see Fig. 2, and this cam is engaged by the outer surface of the spindle head 83.

The spindle 80 is moved backwardly so as to withdraw it from the uncovered roll, by a device, which is herein shown as a plate 86, see Figs. 2 and 3, attached to an upright lever 87, pivoted at its lower end to the framework of the machine, and acted upon by a spring 88 to hold a roller 89, carried by an arm 90 on the lever, in the path of a cam 91 on the side or face of the gear 52 on the shaft *b* of the bed roll. The cam 91 acts on the roller 89 to turn the lever 87, so as to cause the plate 86 to move away from the cam drum or hub 46 and into substantially the position shown in Fig. 2, at which time, the reduced portion of the spindle is withdrawn from the uncovered roll and the latter is free to drop by gravity onto the periphery of the bed roll. The plate 86 is made of sufficient width to enable it to remain in contact with the head of the spindle, while the latter is being moved downwardly for a portion of its circular movement, and the upper edge of said plate is made in the arc of a circle whose center is the center of the drum or hub 46, see Fig. 3. The rotatable cam hub 46 and the spindle 80 covered by it, constitute a rotary transfer mechanism, and provision is made for guiding the uncovered tape roll as it is being transferred from the holder or support 21 for the series of tape rolls down onto the bed roll, and for this purpose, I employ a chute comprising side walls and a front cross or end wall. One of the side walls of the chute is made, as herein shown, in the form of a segmental plate 100 fast on the shaft 47 on which the cam hub or drum 46 is loosely mounted. The plate 100 is provided with a circular slot 101 having the same center as the drum or hub 46, so that the spindle 80 carrying the tape roll, can move freely in said slot. The side plate 100 has extended from it a cross plate or wall 102, see Figs. 2 and 9, which is inclined downwardly toward the bed roll and serves as a back wall for the chute. The other side wall of the chute is made as a plate 103, which may be stationary but is preferably made movable as herein shown, and follows up the spindle as the latter is withdrawn with the endmost tape roll thereon, which latter is brought down in front of the movable side wall 100 by the rotation of the cam drum or hub 46. As the spindle carrying the tape roll is moved back, the tape roll is gradually pressed by the movable side wall 103 toward the stationary side wall 100 of the chute, until the tape roll has been carried down into position to drop onto the bed roll, which is permitted by the spindle being withdrawn from the tape roll and behind the stationary wall 100 of the chute. To facilitate the withdrawal of the spindle, the plate 100 may be provided with anti-friction rollers 104 mounted in the opposite side walls of the slot 101, see Fig. 9. At the time the spindle is withdrawn from the tape roll, the latter is held above but in close proximity to the bed roll, by the movable side wall 103 pressing the tape roll lightly against the stationary side wall 100, and then the movable side wall 103 is returned to its normal or starting position, which releases the tape roll and the latter is pressed down on the tin foil 105 lying on the bed roll. The movable wall 103 of the chute is operatively connected with the yoke or frame 34 carrying the feed pawls so that, when the tape rolls are fed forward, the movable side wall 103 is moved backward, and when the feed mechanism is moved backward, the movable wall 103 is moved forward toward the wall 100. For this purpose, the side wall 103 is fastened to one end of a rod 107, see Figs. 2 and 15, mounted to slide in the arms 108 of a bracket 109 attached to the bracket 22. The rod 107 has connected with it one end of a chain 110 which is passed over a pulley 112, carried by an arm 113 depending from the V-shaped holder 21, see Fig. 16, and is connected to a stud 114 depending from the carrier 34 for the feed pawls 31. On the forward movement of the carrier 34, the chain 110 is drawn taut and moves the rod 107 backward, and on the backward movement of the pawl carrier, the chain is rendered slack, and the rod 107 and the movable side wall 103 of the chute are moved forward by a spring 115, which encircles the rod 107 between a bracket arm 108 and a collar 116 on the rod, see Fig. 15.

Provision is made for pressing the uncovered roll down on the tin foil on the bed roll, so that the uncovered roll will be revolved by the bed roll to wind the tin foil thereon. To this end, a metal plate or piece 120, see Figs. 1, 1ª and 3ª, projects into the path of the uncovered tape roll, and the latter is carried under the said plate, while the spindle is traveling down in the slot 101 in the stationary side wall of the chute. The plate 120 constitutes a presser and serves to press the tape roll down on the bed roll, when released by the spindle and by the movable side wall of the chute. The presser 120 in the present instance, is shown as secured to a folding device, comprising a segmental back plate 121 having the same center as the bed roll and curved side bars 122, which form a groove or passage 123 for the reception of the roll with the tin foil wound thereon, see Fig. 3ª. The side bars 122 are narrower at their front or upper ends to partially fold the portions of the tin foil which project beyond the sides of the roll, and are thicker at their lower or rear ends to complete the folding of the tin foil against the sides of the tape roll.

The folding device is pivoted at 125 to the upper end of lever 126 mounted on a pivot 127 at their lower end. The folding device is connected to the framework by a spring 128, which causes the folding device to press the covered roll against the bed roll, with sufficient force to cause the covered tape roll to be revolved by the bed roll, while the covered tape roll is passing under the folding device. The forward movement of the folder toward the bed roll is limited by pin 129, see dotted lines Fig. 1, extended from the side upright c and which is engaged by a finger 130 on the presser 120, to properly position the latter, so that the tape roll will be carried under the same by the spindle 80. The covered tape roll passes from under the folding device into a chute 133, supported by the framework and from which the covered roll descends into a box or other suitable receptacle (not shown.)

The tin foil 105 with which the tape rolls are covered, is intermittently fed from a continuous length of tin foil, which is preferably in the form of a roll 134, mounted on a shaft 135 supported by the framework. The continuous length of tin foil is passed under a feed roll 136 supported by the upper end of a lever 137, which is pivoted at its lower end to the framework, and connected with the framework by a spring 237, see Fig. 1, which holds the presser roll down on the bed roll, with sufficient force to insure the tin foil being carried forward with the bed roll. The feed roll 136 is provided with a flange 138 of larger diameter, which coöperates with a cam 139 attached to the bed roll, see Fig. 1, and by which the feed roll is lifted away from the bed roll, so as to interrupt the feed of the tin foil, while the portion 105 thereof, which lies on the bed roll, is being cut from the continuous length of tin foil. The tin foil is preferably placed under tension by means of a weight in the form of a roll 140, see Fig. 3, which presses the tin foil against a flat surface or plate 141, secured to a bracket 142 attached to the framework. The bracket 142 is provided with an upright arm 143 having a stud 144, to which is secured one end of a brake strap 145, which passes over the roll 134 of tin foil and is provided with a weight 146 at its lower end.

After a sufficient length of tin foil has been fed forward beyond the feed roll, to insure a length sufficient to properly cover the tape roll, the portion of the tin foil beyond the feed roll, which may be designated a covering strip, is cut from the continuous length, which is effected as hereinshown, by a knife 150, see Fig. 10, pivoted to a lug 151 on the inner circumference of the bed roll adjacent to a transverse slot 152 in the rim of the bed roll. The knife 150 occupies two positions with respect to the bed roll, namely, one position radial thereto as indicated by full lines Fig. 10, and another position axially thereto as indicated by dotted lines.

The knife occupies its radial position while it is passing by the feed roll 136, and at such time the blade projects out of the slot 152, see Figs. 3 and 10, and at or about the time the knife has cleared the feed roll, it is moved down through the slot 152 into its axial position within the bed roll as indicated by dotted lines Fig. 10. As the knife passes through the slot 152 from outside to within the bed roll, it cuts the covering strip 105 from the continuous length of tin foil. The movements of the knife are effected by suitable cams as will be described, which act on a tail piece 154 of the knife.

The cam, which effects the cutting movement of the knife, and which may be termed the knife closing cam, as it moves the knife from its radial position outside of the bed roll into its axial position within the bed roll, is shown as a curved bar 155, see Figs. 3 and 3ᵇ, which is fastened to a stationary bar 156 secured to a block 157 fastened to the framework. The cam, which moves the knife from its closed or axial position into its radial or open position, and which may be designated the knife opening cam, is shown as a curved bar 158 depending from the stationary bar 156.

After the knife has been opened, it is held in this position until the knife has cleared the feed roll 136 by the straight portion 160 of the cam bar 158, and by an upright bar 161 attached to the stationary bar 156, and practically forming a continuation of the straight portion 160 of the opening cam. After the knife has been closed by the cam 155, it remains in this position until it again approaches the feed roll, and to prevent accidental opening of the knife by gravity, as the knife is moving through the lower half of the circular path of the bed roll, a circular guard bar 162, see Fig. 3, is provided, which is arranged to engage the tail piece 154 of the knife and prevent outward movement of the latter.

Provision is made for automatically stopping the machine under conditions, as will be described. To this end, the clutch or starting device 170, which may be of any suitable construction, has pivoted to its operating lever 171, one end of a link 172, which is provided at its free end with a notch 173 in its underside to engage a pin 174 fixed to the framework.

The link 172 is engaged on its underside by a pin 175, see Fig. 2, on one arm of an elbow lever 176, whose other arm is extended down in proximity to the endless bands, so as to be engaged by a pin 177, see Fig. 4, which extends from a heavy device or weight 178, which is carried by the endless bands behind the uncovered tape rolls, said pin projecting laterally so as to engage the long arm of the elbow lever 176, and turn the latter so as to cause the pin 175 to lift the link 172 and disengage it from the pin 174, whereupon the clutch lever 171 is moved by the spring 180 to throw out the clutch, and thus render the driving pulley 181 loose on the shaft of the bed roll and thereby stop the machine. The weight 178 is under the control of the operator, who only places the weight on the feed bands, when he desires that the machine should be stopped automatically after the last tape roll has been fed into the machine. In the present instance the bed roll $a$ is provided with two slots 152 and two knives 150, located substantially diametrically opposite, so that two tape rolls are covered with tin foil at each revolution of the bed roll, and the cam drum or hub 46 is provided with three spindles 80 and with three sets of cams for operating the feed mechanism, so that the uncovered tape rolls may be fed and transferred to the bed roll, one for each half revolution of the bed roll.

The operation of the machine may be briefly described as follows. A series of uncovered tape rolls 20 are placed in the V-shaped holder 21 and rest upon the upper laps of the endless feed bands 27, 28. The tin foil 105 is passed under the feed roll 136 and laid upon the periphery of the bed roll. The lever 171 is moved to throw in the clutch and start the machine in motion. The clutch lever 171 is held in its operating position by engaging the notch 173 in the link 172 with the pin 174 on the framework.

The bed roll $a$ is set in rotation and the cam hub or drum 46 is also set in rotation, and as a result, the uncovered tape rolls are fed one by one into the holding jaws or arms 56, 57, and a spindle 80 is entered into the bore of the tape roll between the said arms. The presser 64 is now operated to engage the roll next to the endmost roll, while the endmost roll is carried back by the arm 55 and the holding jaws or arms 56, 57 toward the cam hub or drum 46, thus affording ample clearance for the spindle to remove the tape roll from the jaws or arms 56, 57. As soon as the tape roll has been removed from between the jaws or arms 56, 57, the latter are moved back toward the holder or support and into the position shown in Fig. 2, by the next succeeding spindle, which engages the lateral extension or arm 62 on the plate 60 and forces the rocker arm against a stop bar 190 carried by the bracket 71, as shown in Fig. 2. This movement of the rocker arm is effected by the cam 85 acting on the head of the spindle 80, whose inner end is in contact with the arm 62 of the plate 60.

The tape rolls 20 are prevented from being displaced vertically on their holder by a rod 191 attached as hereinshown to the stop bar 190. The endmost tape roll, which is removed by a spindle 80 from between the spring arms 56, 57, is carried down in front of the movable wall 103 of the chute by the rotation of the cam hub 46. This wall follows the tape roll toward the fixed wall 100 of the chute, and coöperates with the latter to present the tape roll in proper position above the bed roll. The tape roll is carried by the rotating cam hub under the presser 120, and as soon as the said tape roll is released by the movable wall 103, it is pressed down on the cut portion or strip of tin foil on the bed roll, and is revolved by the bed roll, so as to wind the strip of tin foil thereon into the form of a cylinder having ends, which project beyond the sides of the tape roll, and these projecting ends are folded against the sides of the tape roll to cover the same by the side walls 122 of the folding device, as the tape roll is carried by the bed roll through the passage 123 of the folding device, from which the covered tape roll drops into the chute. In the present instance, the circular object is shown as a tape roll having a central bore into which the spindle 80 is moved to engage the tape roll, but it is not desired to limit the invention in this respect, as circular objects which are not provided with a central bore may be transferred to the bed roll, by using a spindle, which is suitably constructed to engage the circumference or other part of the roll. The movement of the cam bar 85 toward the hub or drum 46 is limited by a stop arm 200.

I have hereinshown one embodiment of the invention, but it is not desired to limit the invention in this respect.

Claims:

1. In a machine of the character described, in combination, a support for a plurality of uncovered rolls, an endless carrier movable on said support and on which said rolls rest, mechanism for moving said endless carrier intermittently, a rotatable bed roll, means for feeding a layer of covering material onto the periphery of said bed roll, means for transferring the uncovered rolls in succession from the endless carrier to the periphery of said bed roll, and means coöperating with the bed roll to press the uncovered roll down on the covering material thereon and cause the latter to be wound upon the uncovered roll by the rotation of the latter by the bed roll, substantially as described.

2. In a machine of the character described, in combination, a rotatable bed roll to support a layer of covering material, means to feed a layer of covering material thereon, a support for uncovered rolls, a rotatable drum carrying a spindle movable with the drum in the rotation of the latter and transversely of said drum to engage an uncovered roll and transfer it from its support to the bed roll, substantially as described.

3. In a machine of the character described, in combination, a rotatable bed roll to support a layer of covering material, a rotatable drum coöperating therewith and provided with a reciprocating spindle to engage an uncovered roll and transfer it to the periphery of said bed roll, and means to operate said parts, substantially as described.

4. In a machine of the character described, in combination, a rotatable drum, a spindle carried thereby and reciprocating transversely thereof, means to rotate said drum, means to reciprocate said spindle while it is being moved in a circular path by said drum, cams carried by said drum, and a feed mechanism reciprocated by said cams to feed the uncovered rolls toward said rotatable drum.

5. In a machine of the character described, in combination, an endless carrier to support a plurality of uncovered rolls, means to move said carrier intermittently, a bed roll upon the periphery of which a layer of covering material for the uncovered rolls is supported, and means to transfer an uncovered roll from the endless carrier to said bed roll to cause the circumference of the uncovered roll to engage the covering material supported by the bed roll, and means coöperating with said bed roll to wind the said covering upon the uncovered roll resting on the bed roll.

6. In a machine of the character described, in combination, a rotatable bed roll to support a layer of covering material, a chute coöperating with said bed roll to guide an uncovered roll to the periphery of the bed roll and having a side wall movable laterally with relation to the plane of rotation of said bed roll, and means to move said movable side wall, substantially as described.

7. In a machine of the character described, in combination, a rotatable bed roll to support a layer of covering material, a support for uncovered rolls located above the bed roll and extended laterally from the plane of rotation of said bed roll, and a rotatable transfer mechanism to transfer an uncovered roll from said support onto said bed roll, and means to operate said parts and means coöperating with said bed roll to wind the covering upon the uncovered roll transferred to the bed roll.

8. In a machine of the character described, in combination, a rotatable bed roll to support a layer of covering material, mechanism for rotating said bed roll, means for holding said mechanism in its operative position, a device to release said holding means, an endless carrier for the uncovered rolls and means carried by said endless carrier for actuating said releasing device to stop the rotation of said bed roll, substantially as described.

9. In a machine of the character described, in combination, a support for a plurality of uncovered rolls, means for moving said rolls intermittently to move the rolls one by one off of one end of the said support, a device for yieldingly engaging the circumference of said uncovered roll on opposite sides thereof and for holding the uncovered roll which is moved off of said support, and means for moving said device toward and from the end of said support, substantially as described.

10. In a machine of the character described, in combination, an endless carrier for a plurality of uncovered rolls, a feed mechanism to move said carrier intermittently, and a rotatable drum having on its periphery a plurality of cams for actuating said feed mechanism and effecting movement of the latter in a direction substantially at right angles to the path of rotation of the said drum, substantially as described.

11. In a machine of the character described, in combination, a rotatable drum, a spindle carried by said drum to move therewith in a circular path and to move transversely of said drum, means to rotate said drum, and means to effect reciprocation of said spindle while it is being moved by said drum, and a stationary plate provided with a circular slot concentric with the drum and into which the spindle is carried by the rotation of the drum and from which it is removed by the movement of the spindle transversely of the drum in one direction, substantially as described.

12. In a machine of the character described, in combination, a chute provided with a movable side wall, and a feed mechanism for the uncovered rolls connected with said movable wall to move the latter in one direction, and means to move the said movable wall in the other direction, substantially as described.

13. In a machine of the character described, in combination, a movable support for a layer of covering material, a rotatable drum coöperating therewith and provided with a reciprocating device movable axially beyond the side of said drum to engage and support an uncovered roll and transfer it to said movable support, and means to operate said parts.

14. In a machine of the character described, in combination, a substantially V-shaped support, endless bands coöperating with said support and forming an endless carrier to support a plurality of uncovered rolls, means to move said carrier intermittently to feed the uncovered rolls off of said carrier, and mechanism coöperating with said endless carrier to receive the endmost roll as it is fed from said carrier and support the said roll independently of the endless carrier.

In testimony whereof I have signed my name to this specification in the presence of two subscribing witnesses.

CARL JOHN LANDIN.

Witnesses:
   JAS. H. CHURCHILL,
   J. MURPHY.